US006704353B1

(12) United States Patent
McCarty, Jr. et al.

(10) Patent No.: US 6,704,353 B1
(45) Date of Patent: Mar. 9, 2004

(54) METHOD AND APPARATUS FOR TRACKING THE MAGNITUDE OF CHANNEL INDUCED DISTORTION TO A TRANSMITTED SIGNAL

(75) Inventors: Robert Joseph McCarty, Jr., Rockwall, TX (US); Akshaya Trivedi, Richardson, TX (US)

(73) Assignee: CynTrust Communications, Inc., Dallas, TX (US)

( * ) Notice: Subject to any disclaimer, the term of this patent is extended or adjusted under 35 U.S.C. 154(b) by 0 days.

(21) Appl. No.: 09/450,487

(22) Filed: Nov. 29, 1999

(51) Int. Cl.$^7$ .................................. H04B 17/00
(52) U.S. Cl. ................ 375/227; 375/261; 375/278; 375/285; 375/350
(58) Field of Search .................. 375/261, 271, 375/278, 285, 320, 346, 350, 326, 227; 329/349, 353, 304; 348/607, 610, 618, 619

(56) References Cited

U.S. PATENT DOCUMENTS 3,944,929 A * 3/1976 Matsuo ...................... 325/363
5,406,588 A * 4/1995 Birchler et al. ............. 375/346
5,640,417 A * 6/1997 Barabash et al. ........... 375/222
6,201,841 B1 * 3/2001 Iwamatsu et al. ........... 375/346

* cited by examiner

*Primary Examiner*—Stephen Chin
*Assistant Examiner*—Dac V. Ha
(74) *Attorney, Agent, or Firm*—Slater & Matsil, L.L.P.

(57) ABSTRACT

Channel induced distortion is cancelled from a QAM or similarly modulated signal that has both a signal component and a distortion component. Using digital signal processing, the information component of the received signal is removed by canceling magnitude variations arising from the information content. This is accomplished by normalizing the received signal to the magnitude value of one ring on the QAM constellation. Once the distortion component of the received signal is reconstructed, a compensation factor can be derived and applied to the received signal in order to remove the effects of the channel distortion prior to further processing and decoding of the received signal. Applications include radio communications including cellular telephones and two way radio, as well as wire-based communications in which the transmission channel induces distortion to the signal

23 Claims, 5 Drawing Sheets

Symbol

FIG. 3A

Symbol

METHOD AND APPARATUS FOR TRACKING THE MAGNITUDE OF CHANNEL INDUCED DISTORTION TO A TRANSMITTED SIGNAL

This application is related to pending patent application Ser. No. 09/295,660 filed on Apr. 21, 1999 and entitled "Bandwidth Efficient QAM on a TDM-FDM System for Wireless Communications" which application is incorporated herein by reference.

FIELD OF THE INVENTION

The present invention relates to a receiver for an amplitude modulated signal and more particularly to tracking the amplitude of an incoming signal and recovering the desired signal (amplitude) from distortion imposed by the transmission channel by reconstructing the channel-induced amplitude distortion.

BACKGROUND OF THE INVENTION

Communication and telecommunication devices use a variety of modulation techniques for transmitting information. Commonly employed techniques include frequency modulation (FM), phase shift keying (PSK) and quadrature amplitude modulation (QAM). As the terms imply, FM involves modulating the frequency of the carrier signal, PSK involves modulating the phase, and QAM, involves modulating both the phase and the amplitude of a carrier signal.

A pervasive problem in telecommunications is the distortion imparted onto the signal during transmission and the need to recover, as accurately as possible, the desired signal from the noise, attenuation and distortion imposed by the transmission channel. This problem is particularly severe with radio telecommunication devices such as two-way radios and cellular phones.

Channel-induced distortions imposed upon the amplitude of the transmitted signal can be particularly difficult to compensate for. In a QAM system, the carrier signal will be modulated to two or more discrete amplitudes. For practical circuit design, these discrete amplitude levels cannot be greatly far from one another and hence the distortion imposed by the transmission channel can cause errors on the receiving side when trying to determine at what amplitude level the signal was actually sent.

With differential QAM systems, the information in the signal is encoded in the difference in the amplitude of adjacent sample points (symbols) of the signal, rather than in the absolute amplitude of the symbols themselves. Differences in the amplitude of the received signal may be interpreted on the receiving side as differences in the amplitude of the transmitted signal, such as a jump from one ring of the QAM constellation to the next, when in fact, the amplitude change was due to fading of the signal in the transmission channel. On the other hand, an intended jump from one ring of the constellation to another, might be lost due to channel fading causing the overall received signal amplitude to remain unchanged (or in fact going in the opposite direction of the transmitted amplitude change).

One prior art approach to recovering signal amplitude is the use of pilot symbols in the transmitted signal. These pilot symbols are of a known configuration (i.e. known location in a frame) and known amplitude (and phase). The receiver recognizes the pilot symbols and knows at what amplitude level the pilot symbol was transmitted. Knowing the level at which the pilot symbol was transmitted and knowing the amplitude of the actual received symbol, it is a relatively easy calculation to determine the distortion caused by the channel and to impose a compensation signal onto the received signal to remove the channel effects from it. Multiple pilot symbols need to be inserted into the transmitted signal periodically, as the channel effects are time variant.

With mobile telecommunication devices, channel effects can change rapidly (for example with a cellular phone in a car traveling at highway speeds). For this reason, pilot symbols must be inserted into the transmitted signal often. A shortcoming with the use of pilot symbols is that the pilot symbols add to the "overhead" of the transmitted signal (i.e. the portion of the signal associated with synch and control, not associated with the actual information such as data or voice information being transmitted). Pilot symbols, therefore, lower the useful bandwidth of the telecommunication system.

A need exists in the prior art for a system in which the magnitude of an incoming amplitude-variant signal can be tracked, and channel distortions to the channel removed, without significantly decreasing the information carrying capacity, or bandwidth of the transmitted signal.

SUMMARY OF THE INVENTION

The present invention provides for processing a received signal in order to more accurately decode the received signal for information content. The received signal has an information content component and a channel-induced distortion component. The information content component is comprised, at least in part, in variations in transmitted signal magnitude. The information content component of the received signal is removed from the received signal by canceling magnitude variations in the received signal arising from the information content. In this way, the remaining signal's magnitude variations are those that result from channel-induced distortion. This reconstructed channel-induced distortion can then be used to generate a compensation factor that can be applied to the received signal to remove the effects of the channel-induced distortion from it, thus allowing a more accurate decoding of the received signal.

DESCRIPTION OF PREFERRED EMBODIMENTS

For illustration, preferred embodiments of the invention are described in the context of a two-way radio system using two-ring differential QAM modulation for signal encoding. The teachings of the present invention would apply as well, however, to wireline transmission devices (e.g., the public telephone network), and to other modulation schemes such as three-ring QAM, phase shift keying (PSK), differential phase shift keying (DPSK), frequency shift keying (FSK) and the like.

As is known in the art, QAM modulation techniques involve coding a complex signal by shifting both the magnitude and the phase of the signal. In the preferred embodiment, a sixteen point, two ring constellation is employed, meaning that each coded symbol (consisting of four bits) will have one of two possible magnitude values. Symbols on the inner ring of the constellation have a first magnitude (amplitude) and symbols on the outer ring have a second, larger magnitude. Several possible phase shifts are also represented in the QAM constellation, but the phase coding and decoding of the QAM signals is not necessary for an understanding of the present invention.

Figure 1:
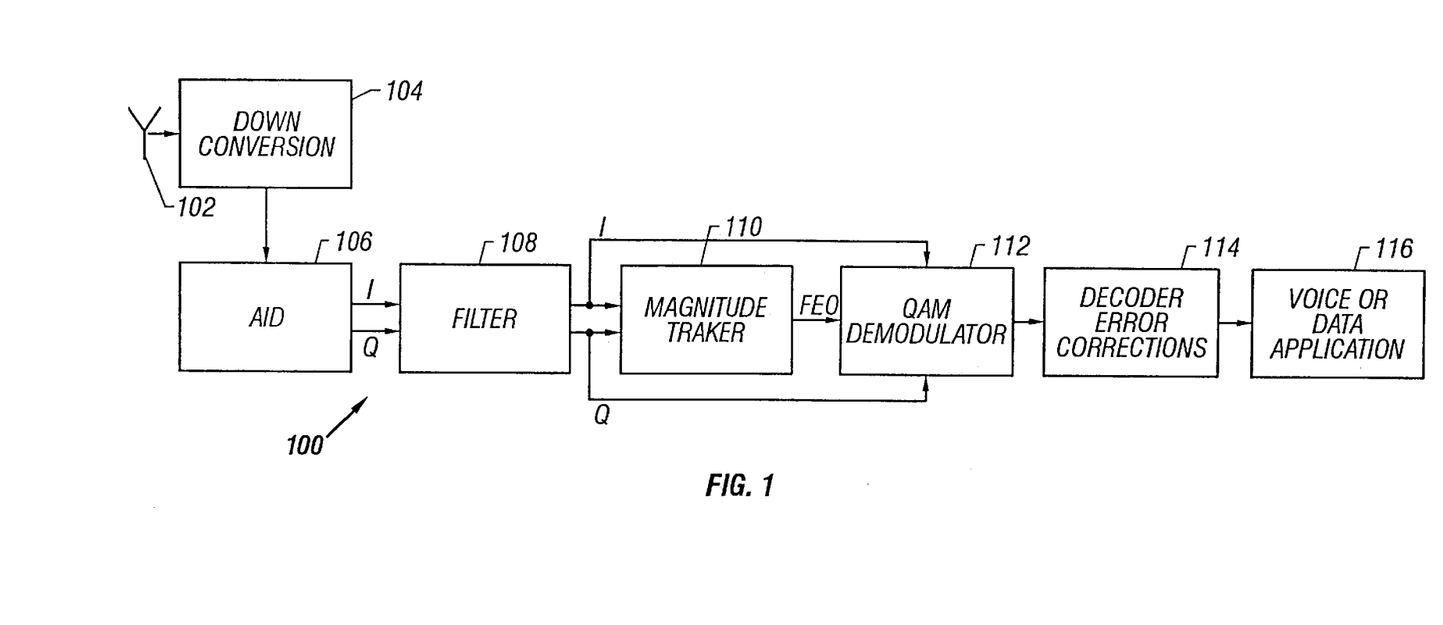
FIG. 1 is a block diagram of a digital receiver system in which embodiments of the current invention may employed.

A first preferred embodiment digital receiver 100 employing the present invention is shown in FIG. 1. An incoming signal is received at antenna 102 and down converted from RF to baseband frequency in down converter 104. The signal is then converted to a digital signal in AND converter 106. As will be apparent to those versed in the art, accurate selection of the proper sampling points for analog to digital conversion is important for further processing of the incoming signal. The timing and sampling points for A/D 106 is determined from clocking and synch signals contained within the incoming signal.

The digital signal, which consists of a series of digital values, or sample points, is passed to digital filter 108, where the incoming digital signal is pulse shaped and bandwidth limited. Each of these sample points corresponds to a symbol of the QAM constellation that was transmitted. In the preferred embodiments, digital filter 108 is a Nyquist filter, as described in more detail in co-pending application Ser. No. 09/295,660. The filtered signal is then fed to QAM demodulator 112. The filtered signal is also fed to magnitude tracker 110, where the effects of channel-induced distortion to the magnitude of the incoming signal are re-constructed and an error correction factor signal is derived. From magnitude tracker 110, the error correction factor signal information is passed to QAM demodulator 112, where the information contained within the incoming signal is decoded. QAM demodulator 112 uses the information about the channel-induced magnitude distortion, derived in magnitude tracker 110, to more accurately determine whether the transmitted signal contained an intentional change in magnitude, as will be explained in more detail below. The demodulated signal is then passed to decoder/error correction block 114 where Viterbi de-coding, redundancy de-coding and other decoding is performed, before being passed to a voice or data application. In the case of a voice application, the signal may be passed through a D/A converter before being passed to an I/O device, such as a speaker (not shown). It will be apparent to one skilled in the art that many features and components of a digital receiver 100 not necessary for an understanding of the invention are omitted from FIG. 1 for the sake of clarity.

Figure 2:
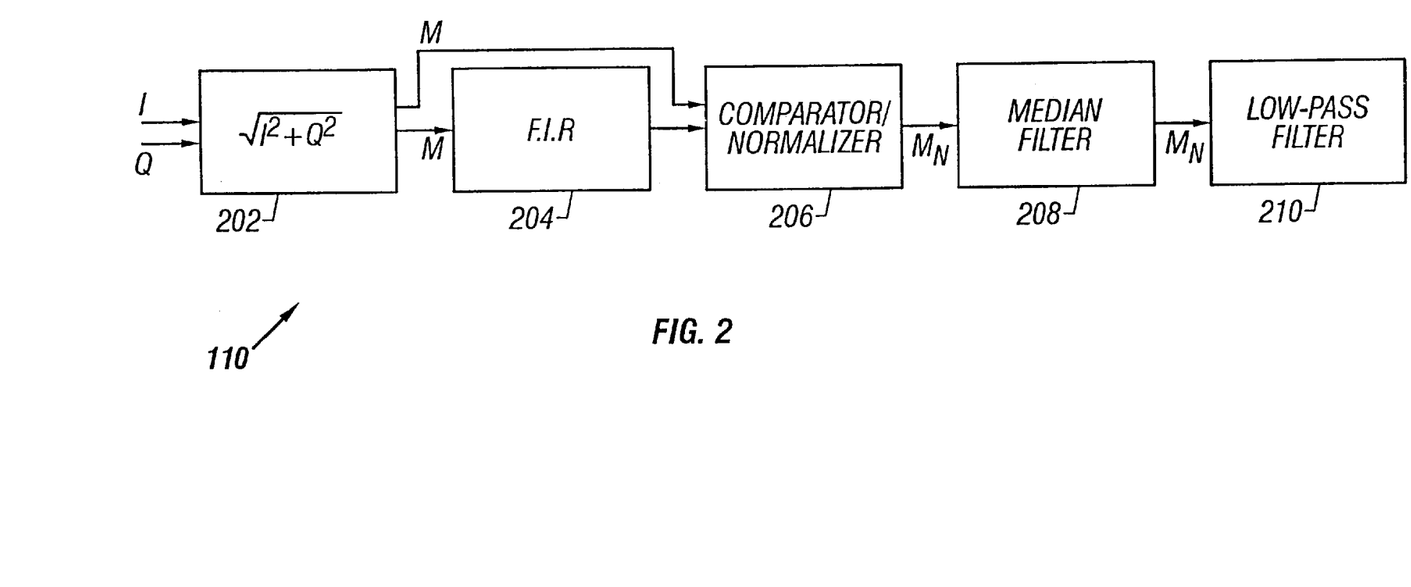
FIG. 2 is a block diagram of a first preferred magnitude tracker.

Further details regarding magnitude tracker 110 will now be provided with reference to FIG. 2. The incoming signal to the receiver is a complex signal, which can be broken into two quadrature components, commonly referred to as the I (in-phase) and Q (quadrature) components of the complex signal. Both the I and Q components are sampled and filtered separately, as indicated by the separate I and Q signal paths of FIG. 1. Preferably, the components are sampled at a 4 kHz sampling rate (synchronized to the symbol clock rate of the incoming signal).

In the preferred embodiment, the incoming signal is time multiplexed and has multiple voice frames per time slot. Preferably, the incoming signal has three 10 ms voice (or data) frames per time slot. Hence, each frame will have 40 sample points at the 4 kHz sampling rate. The following discussion applies to each time frame of the incoming signal.

As discussed above, the purpose of the magnitude tracker, also known as a fade estimator, is to provide for each symbol, a scale factor or error correction factor that may be used to compensate for variations induced by multipath, blockage, lobe effects or other channel-induced distortions on the magnitude of the symbol.

The inputs to magnitude tracker 110 are the magnitudes of the quadrature I and Q pair, from which the magnitude of the signal is derived from the square root of the sum of the squares of the I and Q components, i.e. $\sqrt{(I^2+Q^2)}$, as shown in block 202.

Figure 3A:
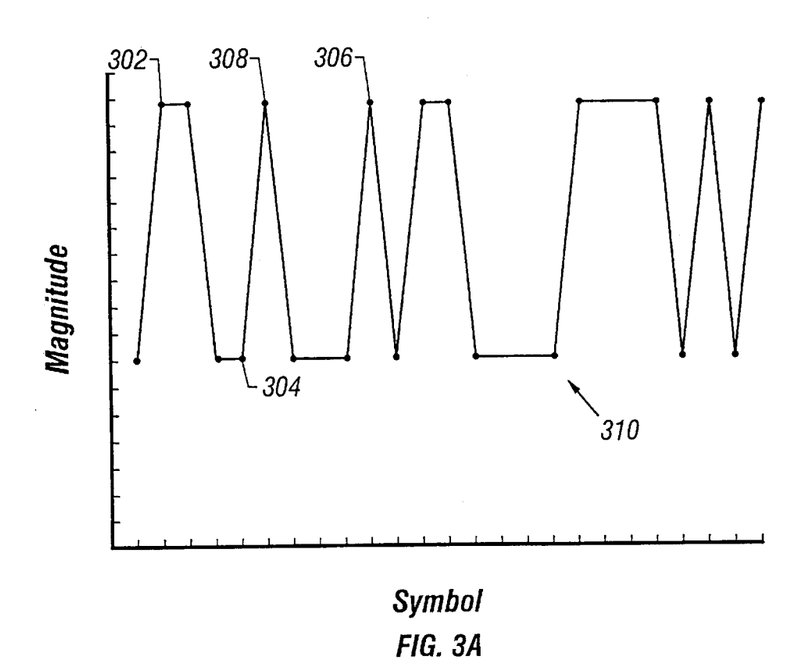
FIG. 3a illustrates an "idealized" incoming magnitude signal.

FIG. 3a represents an "idealized" magnitude signal derived from block 202 in which no fading is present. Note that every data point or symbol, 302, 304, 306, etc. is at either one of two magnitude values, corresponding to the values of the two rings on the QAM constellation.

Figure 3B:
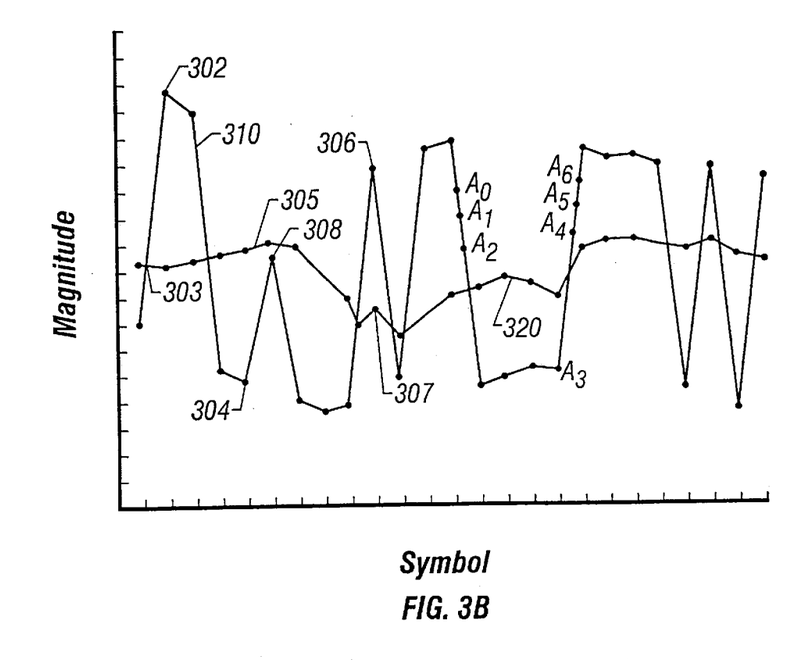
FIG. 3b illustrates a non-idealized incoming magnitude signal showing channel-induced fading.

By contrast, FIG. 3b illustrates a non-ideal magnitude signal wherein fading from channel induced distortion is shown. Note that the symbols' magnitudes have varied from the ideal, with some symbols being less than the "ideal" lower value, some symbols being above the "idealized" upper value, and some symbols being intermediate the upper and lower values. These channel effects cause unintended modulation of the magnitude of the signal which may result in errors in the QAM demodulation process.

The magnitude tracker 110 estimates the underlying variation in the signal magnitude in order to offset or compensate for such unintended modulation Briefly, the function of the magnitude tracker 110 can be broken down into three main functional parts: (1) estimation of the mid-ring magnitude; (2) normalization of the magnitude to the inner ring value; and (3) filtering of the normalized value. These functions are described in more detail below.

Estimation of Mid-Ring Magnitude

The magnitude signal derived from block 202, consists of an array of magnitude values and is denoted by signal M in FIG. 2. Note that, as illustrated in FIG. 3b and discussed above, this magnitude signal contains an information content component (i.e. the "intended" or transmitted signal) and a channel-induced distortion component (i.e. the unintended modulation of the magnitude arising from channel effects and fading) Signal M is fed through finite impulse response (F.I.R.) or rectangular filter 204. Rectangular filter 204 operates on the incoming magnitude signal and provides a "moving" or "localized" average of the magnitude signal M, as follows.

A window, of width n, is slid forward through the array of magnitude values. The average of the magnitude in the window is calculated for k=0, 1, 2 . . . (number of symbols= n) as:

$$\text{average} = \sum_{i=0}^{n-1} M_{(k+1)}/n$$

where: M=magnitude of the I, Q pair as calculated in block 202.

Further filtering, and the elimination of the n−1 symbol time lag induced from the first sliding window filter is accomplished by sliding a second window backwards through the array of results from the first pass through filter 204. In other words, the incoming magnitude signal M is fed forwards through filter 204 and the results are then fed backwards through the filter. Curve 320 of FIG. 3 illustrates the results of feeding signal M (curve 310) forwards and backwards through the sliding window average filter 204.

In the preferred embodiments, n=4, although such specifics of the filter 204 is a matter of design choice, primarily depending on the channel distortion bandwidth. An averaging filter that averages too many points (i.e. a large n) smooths out the channel distortion effects that are sought to be recovered by fade estimator 110. Conversely, a filter that averages too few points, allows noise to pass through the filter, making the channel effects magnitude reconstruction noise driven, rather than driven by the distortion imposed by the channel.

Normalization of Magnitude to Inner Ring

Curve 320 represents the "mid-ring" magnitude for the incoming signal M. This mid-ring value is then used to normalize the symbols to the lower ring value. For each symbol, the magnitude is compared to the mid-ring value. With reference to FIG. 3b, each point 302, 304, 306 . . . of the magnitude signal M (curve 310) is compared to the corresponding point 303, 305, 307 . . . on the mid-ring value signal of curve 320. Magnitudes above the mid-ring magnitude are normalized to the inner ring. Magnitudes lower than the mid-ring reference are assumed to be inner ring values and hence are not modified. Further details of this function are provided below.

As shown by comparator/normalizer block 206, each symbol of magnitude signal M is compared to the corresponding mid-ring magnitude calculated in block 204. Each point on the magnitude signal 310 that is above (magnitude greater than) the corresponding point of the average curve 320 is considered to have been transmitted on the upper ring of the QAM constellation. Each point on the magnitude signal 310 that is below its corresponding point on the average curve 320 is considered to have been transmitted on the lower ring of the QAM constellation.

It is desirable to remove the component of magnitude signal M associated with the transmitted data, i.e. the information component of signal M in order to re-construct the channel-induced component of the signal. As will become apparent below, once the channel-induced component of magnitude signal M has been reconstructed, or isolated, it is then possible to derive a compensation factor to apply to the incoming signal in order to remove or at least minimize the effects of the channel-induced distortion.

The information component of signal M is canceled by normalizing all the incoming data points to the value of the lower ring of the QAM constellation. This normalization is accomplished by dividing each upper ring point (i.e. each point above the average curve) by the ring ratio. The ring ratio is defined as the ratio of the value of the upper ring on the QAM constellation to the lower ring. In the preferred embodiment, the ring ratio is 1.8.

As an example, two sample points on magnitude signal 310 are selected for further discussion. Point 302 represents a sample point of magnitude signal M that is of a greater magnitude than the corresponding point 303 of the average curve 320 (the results of filter 204). In order to normalize point 302 to the lower ring, the value for this point is divided by the ring ratio (e.g. 1.8) in comparator/normalizer block 206. By contrast, point 304, being of a magnitude less than the corresponding average point 305, is presumably on the lower ring of the QAM constellation, and hence this point does not need to be normalized.

In alternative embodiments, other normalization techniques could be employed. For instance, the curve could be normalized to the upper ring by multiplying by the ring ratio those points on the magnitude curve that lie below (lesser magnitude than) the average curve. Alternatively, magnitude points could be normalized to some other value. One such alternative approach would be to normalize all the magnitude points to a value representing the average between the upper and lower rings. Other variations for normalizing the information content portion of the magnitude signal M will be apparent to one skilled in the art, provided the results of the normalizing step is such that variations in the magnitude signal M arising from the transmitted signal are effectively canceled. The resulting output will be a signal $M_N$ for which variations in the magnitude arise primarily from channel-induced distortion such as fading.

Filtering of Normalized Magnitude

Once the normalized magnitude data has been determined, the output from filter 204 can be disregarded. All subsequent processing involves the normalized magnitude signal $M_N$ output from comparator/normalizer 206.

The final step in the fade estimation process is to pass the normalized magnitudes through two additional filtering states. The first stage is a median filter applied to remove "outliers," i.e. symbols on the upper ring that might not have been normalized in comparator/normalizer block 206. The second stage is a set of first-order, low-pass filters. These stages are discussed in more detail in the following paragraphs.

Under certain conditions, channel effects can cause the magnitude signal to attenuate so much that a value on the upper ring can "appear" to comparator/normalizer 206 to be a lower ring value. In other words, the point will have a value of less than the corresponding point on average curve 320 even though the point is actually an upper ring value. Data point 308 of signal 310 illustrates such a situation where the symbol that was transmitted on the upper ring (compare point 308 of FIG. 3a) falls below the mid-ring magnitude when received. This can occur, for instance, as a result of Raleigh fading. Failing to recognize such a point will result in inaccuracy in the re-constructed channel signal. To compensate for points of such extreme fading, the normalized magnitude signal $M_N$ output from comparator/normalizer 206 are fed to median filter 208.

Median filter 208 operates to smooth out "spikes" resulting from missed points, as discussed in the preceding paragraph. This is accomplished by applying a smoothing function to the incoming signal $M_N$. In the first preferred embodiment, median filter 208 smoothes the incoming signal by taking the median value of a moving window of five data points. In other words, median filter 208 operates by taking the first set of five points on incoming signal $M_N$ and ranking them in magnitude order. For five data points, the median point is the middle value in magnitude ranked order. Alternatively, an even number of data points, such as four, could be chosen and placed in rank order. With an even number of data points, the median value is found by interpolating between the middle two magnitude ranked points. Note that this median filter function is different from the moving average function of filter 204.

Figure 4:
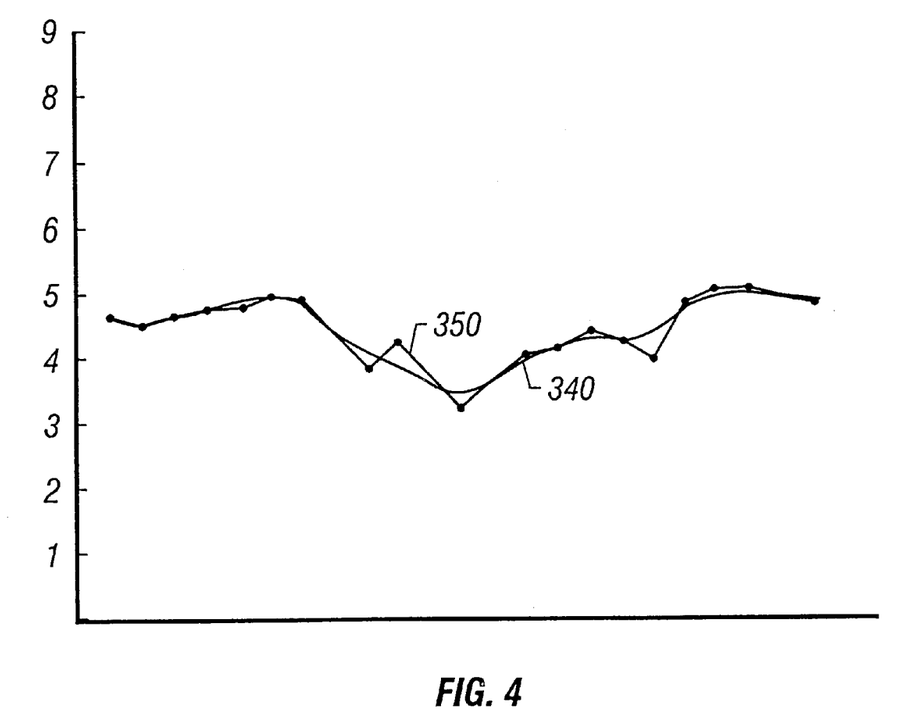
FIG. 4 illustrates the results of applying a normalized magnitude signal to a median filter.

Because the signal has been subjected to the moving window median calculation, this has the effect of eliminating rapid (short-term) changes in the signal's magnitude (i.e. spikes). This further eliminates the remaining transmitted signal component (i.e. the information content) from the magnitude signal that might have not been eliminated in comparator/normalizer 206. FIG. 4 illustrates the output from median filter 208 as bold curve 340 and also illustrates the input to median filter 208 (i.e. the normalized signal $M_N$) for comparison.

The rationale for the above described function is as follows. As the incoming signal enters a period of extreme fading, points on magnitude signal M that correspond to a transmitted point on the "upper ring" of the QAM constellation (i.e. the higher magnitude) might be so attenuated by channel-induced distortion, that the corresponding point on magnitude curve M falls below the moving average curve 320 calculated in filter 204. Because this low value point will not be treated as an upper ring value in comparator/normalizer 206 (i.e. will not be divided by the ring ratio of 2.29), it will appear as a high magnitude spike in normalized magnitude signal MN. This spike in the magnitude value is attributable to the transmitted signal component of the incoming magnitude signal, rather than due to the channel-induced distortion. By passing normalized magnitude signal MN through median filter 208 and effectively filtering out such spikes, the information content component of the signal is further eliminated.

The output from median filter 208 is then fed to single pole low pass filter 210. This has the effect of smoothing out the discontinuities that result from median filter 208, i.e. of smoothing out the "corners" on the signal curve. The signal is fed through low pass filter 210 forwards and backwards in order to minimize the effects of lag or lead resulting from the filter.

Filter 210 is implemented as:

$$y_{(i)} = y_{(i-1)} + wT(x_{(i)} - y_{(i-1)})$$

where: i=symbol index;

x(i)=filter input;

y(i)=filter output;

w=1/filter time constant; and

T=1/symbol rate.

The resulting signal output from low pass filter 210 is an accurate reconstruction of the fading and other channel effects imposed on the originally transmitted signal by the transmission channel. From this reconstructed distortion signal, a compensation factor can be determined in order to more accurately reconstruct the transmitted signal and to decode the same.

Using Reconstructed Channel Effects for Demodulation

As explained above, the information contained in the magnitude of a differential QAM coded signal is contained not in the absolute magnitude of a given signal point (symbol), but rather in the relative difference between each two sample points (symbols). For instance, in the preferred embodiments, a ring change between two adjacent symbols is decoded as a "1" and no ring change between adjacent symbols is decoded as a "0." For completeness, it must be mentioned that each QAM symbol in the preferred embodiments represents four bits (i.e. 16 point QAM). The remaining three bits are coded in the relative phase of adjacent symbols. Coding and decoding of the relative phase is outside the scope of the present invention.

A brief discussion of differential QAM demodulation is first provided. The determination of whether the incoming signal represents a ring change is determined as follows, for two random points, $A_1$ and its immediately preceding point $A_0$. In order to determine whether $A_1$ has changed rings from $A_0$ the relative difference in magnitude between them is determined with comparison to the ring ratios (i.e. the ratio between the rings of the QAM constellation).

In a preferred embodiment system in which the upper ring value is 1.8 and the lower ring value is 1, the ratio of the upper ring to the lower ring is 1.8, and the ratio of the lower ring to itself is, of course, 1. The average ring ratio is therefor, 1.4. This ring ratio average is referred to for convenience as "factor one" or $F_1$. The inverse of the ring ratio average ($1/F_1$) is referred to a "factor two" for ago convenience or $F_2$. Each incoming sample point (symbol) of the incoming magnitude signal is compared to the value of the preceding sample point (symbol) according to the following comparisons:

If $A_1 > A_0 * F_1$ then a ring change has occurred (i.e. the outer bit of the symbol is decoded as "1"). This would be the case when $A_1$ was on the upper ring and $A_0$ was on the lower ring.

If $A_1 < A_0 * F_2$ then a ring change has occurred (i.e. the outer bit of the symbol is decoded as "1"). This would be the case when $A_1$ was on the lower ring and $A_0$ was on the upper ring.

Else, no ring change has occurred (i.e. the outer bit of the symbol is decoded as a "0").

The above comparisons do not account for the fact that the differences in magnitude between points $A_1$ and $A_0$ of the received signal might be due to channel-distortion, as opposed to being due to the magnitude of the transmitted signal. In the preferred embodiments of the present invention, channel effects are factored in by deriving a compensation or correction factor from the reconstructed channel signal determined as described above.

Figure 5:
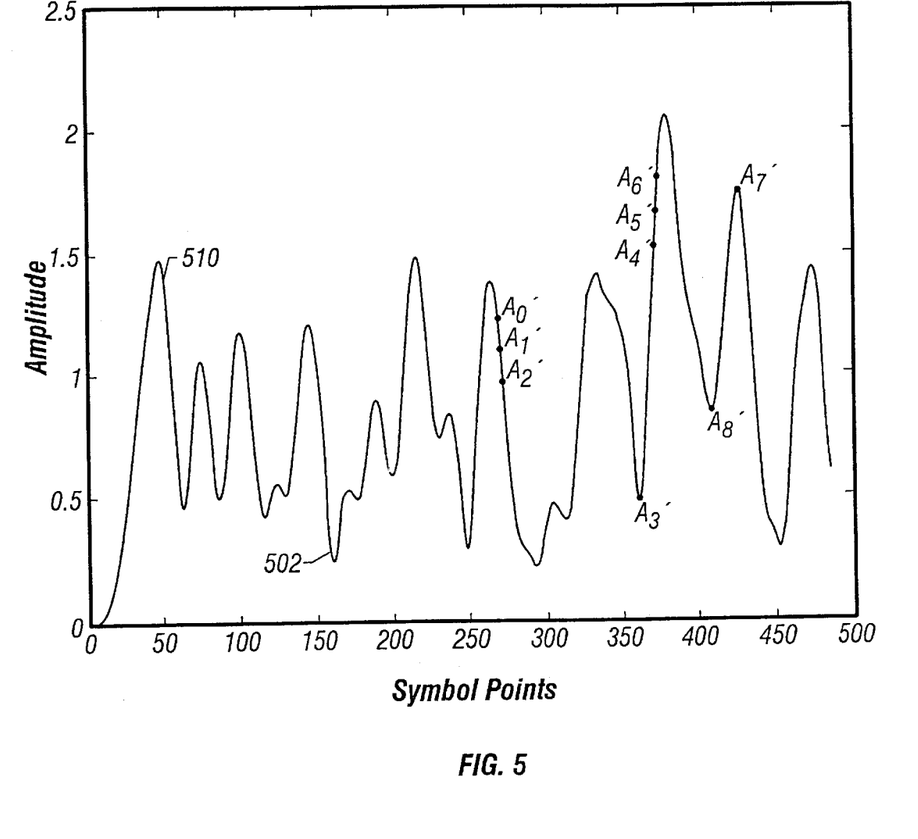
FIG. 5 illustrates a reconstructed channel-induced magnitude signal resulting from a preferred embodiment magnitude tracker.

FIG. 5 illustrates the results of the magnitude tracker on a simulated signal. Three points on an exemplary output signal from magnitude tracker 110 are illustrated as $A_1'$, $A_0'$ and $A_2'$. Note that these points are the re-constructed channel effects curve which is different from but corresponds to the incoming magnitude (signal M). Curve 510 represents the channel-induced distortion on the magnitude of the transmitted signal, as reconstructed by magnitude tracker 110. The actual points to be demodulated $A_1, A_0, A_2 \ldots$ are on curve 310 of FIG. 3b. For each point $A_1, A_0, A_2 \ldots$ of the actual magnitude signal M, however, there is a corresponding point $A_1', A_0', A_2' \ldots$ on the normalized magnitude data curve 510 (which is the portion of the incoming signal due to channel-induced distortion). It is from the channel-induced distortion component that the compensating or correction factor to apply when demodulating the actual magnitude signal M is derived.

Taking point $A_1$, as an example, the correction factor for compensating for channel-induced distortion when demodulating point $A_1$ would be calculated from points $A_1'$, and $A_0'$ by taking the ratio of the magnitude of those two points, i.e. $A_1'/A_0'$. This ratio, termed "error correction factor" or $F_{EC}$ corresponds to the change in the magnitude of the incoming signal that is due to channel-induced distortion. This error correction factor $F_{EC}$ is then incorporated into the demodulation scheme described above as follows.

If $A_1 > A_0 * F_1 * F_{EC}$ then a ring change has occurred (i.e. the outer bit of the symbol is decoded as "1").

If $A_1 < A_0 * F_2 * F_{EC}$ then a ring change has occurred (i.e. the outer bit of the symbol is decoded as "1").

Else, no ring change has occurred (i.e. the outer bit of the symbol is decoded as a"0").

In this way, the effects that channel-induced distortion might otherwise have on the magnitude of the incoming symbols is removed by applying to the demodulation formulae an error correction factor that eliminates the magnitude effects of the channel. In alternative embodiments, a "forward looking" rather than "backward looking" error correction factor could be employed by using the ratio between $A_2'$ and $A_1'$ ($A_2'/A_1'$). Alternatively, the error correction factor could be derived from the two adjacent symbols to the symbol under consideration ($A_2'/A_0'$). Various other permutations will be apparent to one of skill in the art, the desire being that the error correction factor be determined from the magnitude ratio of the channel-induced distortion curve in the immediate vicinity of the symbol being demodulated.

The preferred embodiments of the present invention provide a distinct advantage of adaptively calculating the threshold for determining whether a ring change has occurred. This adaptive determination is possible because the threshold is continuously modified by a dynamic correction factor ($F_{EC}$) which is derived from the actual (reconstructed) channel distortion at the local point of the symbol(s) being demodulated. This adaptive threshold calculation allows for considerably more accurate decoding of the symbols, even under conditions of low SNR.

Note that symbol $A_1'$ is at a portion of the channel-induced distortion curve 502 where the incoming signal is rapidly fading. The above teachings apply equally, however, to those portions of the incoming signal where the channel-induced distortions are causing a rapidly increasing signal strength (i.e. the signal is coming out of a faded region). Symbol points $A_4'$, $A_5'$, $A_6'$. . . illustrate such a region. For corresponding symbol $A_5$, an appropriate error correction factor to be applied to the demodulation scheme would be $A_6'/A_5'$ or some other permutation as discussed above.

Another advantage of the preferred embodiments is that reconstructing the channel-induced distortion allows for easier detection of "at-risk" symbols, i.e. those symbols that are likely to be misinterpreted in demodulator 112. Areas where misinterpretation are likely to occur are symbols with a relatively low SNR and areas where the signal is rapidly entering or exiting from a fade. Point $A_3'$ illustrates the former case and points $A_7'$ and $A_8'$ illustrate the latter. By processing curve 502, at risk symbols can be readily identified and their identity passed on to soft decision Viterbi decoder 114. This accomplished by assigning a probability of error to the symbol by statistically analyzing the data. The estimated probability of symbol error is used the Viterbi folder as will be known to one skilled in the art, but is not necessary for an understanding of the present invention.

The above teaching applies equally as well to systems in which multiple sub-channels are transmitted on a single defined channel, such as are described in co-pending application Ser. No. 09/295,660. With such systems, it is desirable to eliminate the effects of each adjacent sub-channel when demodulating a selected sub-channel. The above described preferred embodiments allow the channel-induced distortion of each sub-channel to be identified, quantified and compensated for in order to eliminate or greatly reduce the interference between adjacent sub-channels.

Note that many of the features and functions discussed above can be implemented in software running on a digital signal processor or microprocessor, or preferably a combination of the two. Alternatively, dedicated circuits can be employed to realize the advantages of the above described preferred embodiment. The foregoing detailed description of preferred embodiments is intended by way of example only and is not intended to limit the scope of the invention defined in the appended claims.

We claim:

1. A method for decoding a transmitted signal comprising:
   a. receiving a signal, the signal comprising an information component and a channel-induced distortion component, the information component including magnitude variations;
   b. canceling from the received signal the magnitude variations arising from the information component in order to reconstruct the channel-induced distortion component of the received signal;
   c. generating a correction factor from the reconstructed channel-induced distortion component of the received signal.

2. The method of claim 1 wherein the information component of the received signal is a series of QAM modulated symbols, each symbol having been transmitted at one of a plurality of predefined magnitudes, and wherein the canceling step is achieved by normalizing the symbols to a predefined reference level.

3. The method of claim 1 wherein said transmitted signal comprises a radio frequency QAM modulated signal.

4. A method for decoding a transmitted signal comprising:
   a. receiving a signal, the signal comprising an information component and a channel-induced distortion component, the information component including magnitude variations and wherein the information component is a series of QAM modulated symbols, each symbol having been transmitted at one of a plurality of predefined magnitudes;
   b. canceling from the received signal the magnitude variations arising from the information component in order to reconstruct the channel-induced distortion component of the received signal by normalizing the symbols to a predefined reference level, wherein the canceling step further comprises:
      deriving a ring ratio from the plurality of predetermined magnitudes;
      determining for each symbol a corresponding mid-ring magnitude value determined from the average of the magnitude of the symbol and n adjacent symbols, wherein n is an integer;
      comparing each symbol to the corresponding mid-ring magnitude value; and
      for each symbol that has a magnitude that deviates in a pre-defined manner from the corresponding mid-ring magnitude value, dividing the magnitude of the symbol by the ring ratio; and
   c. generating a correction factor from the reconstructed channel-induced distortion component of the received signal.

5. The method of claim 4 wherein said pre-defined manner of deviation is met when the symbol under consideration has a magnitude greater than the corresponding mid-ring magnitude value.

6. The method of claim 4 wherein said pre-defined manner of deviation is met when the symbol under consideration has a magnitude lesser than the corresponding mid-ring magnitude value.

7. The method of claim 5 or 6 wherein said plurality of predefined magnitudes comprises a first and second ring magnitude; and
   the ring ratio is the ratio of the first and second ring magnitudes.

8. The method of claim 4 wherein said pre-defined manner of deviation is met when the symbol under consideration has a magnitude of lesser or greater than the corresponding mid-ring magnitude value, and wherein for those symbols having a magnitude greater than the corresponding mid-ring magnitude value, the ring ratio is defined as the ratio of a first pre-defined magnitude to the average of a first and second pre-defined magnitude, and for those symbols having a magnitude less than the corresponding mid-ring magnitude value, the ring ratio is defined as the ratio of a second pre-defined magnitude to the average of said first and second pre-defined magnitudes.

9. A method for demodulating a received signal, the received signal comprising a signal modulated on a QAM constellation, wherein the amplitude of the QAM modulated signal has been distorted by channel effects, comprising:

generating a magnitude signal from the square root of the sum of the squares of the I and Q components of the received signal;

passing the magnitude signal through a filter to generate a localized average signal comprising a moving average of every n points of the magnitude signal, wherein n is an integer;

comparing the magnitude signal to the localized average signal to identify those points on the magnitude signal that deviate from the localized average signal in a predefined way;

generating a normalized magnitude signal by operating on the identified points on the magnitude signal to normalize those points to a predefined reference level; and passing the normalized magnitude signal through a low pass filter to filter out high frequency components of the signal to generate a reconstruction signal of the distortion caused by the channel effects.

10. The method of claim 9 further comprising:

generating an error correction factor from the ratio of the magnitude of localized points on the reconstruction signal; and using the error correction factor to adaptively determine the threshold for determining whether adjacent symbols on the received signal were transmitted on different rings of the QAM constellation.

11. A method for determining the magnitude of an incoming differential QAM signal, the QAM constellation having an inner ring and an outer ring, wherein the ratio of the magnitude of the outer ring to the magnitude of the inner ring is the ring ratio, comprising:

sampling the magnitude signal of the incoming signal at selected sampling points to generate a magnitude signal;

applying the magnitude signal to a finite impulse response smoothing filter to produce a smoothed signal;

comparing the selected sampling points of the filtered signal with corresponding selected sampling points of the smoothed signal;

for each selected sampling point of the magnitude signal that is of greater magnitude than the corresponding selected sampling point of the smoothed signal, dividing the sampling point of the magnitude signal by the ring ratio, to produce a normalized signal;

applying the normalized signal to a median filter; and applying the results of the median filter to a single pole low-pass smoothing filter to generate a channel effects signal.

12. The method of claim 11 wherein the ring ratio is 1.8.

13. The method of claim 11 further comprising:

deriving an error correction factor from the channel effects signal; and applying the error correction factor to compensate for channel-induced distortion when demodulating the incoming differential QAM signal.

14. The method of claim 13 wherein every point on channel effects signal corresponds to a point on the incoming differential QAM signal and wherein the error correction factor is derived from the ratio of (i) the point on the channel effects signal corresponding to the point on the incoming differential QAM signal being demodulated, and (ii) the immediately preceding point on the channel effects signal.

15. The method of claim 13 wherein the error correction factor is derived from the ratio of (i) the point immediately succeeding the point on the channel effects signal corresponding to the point on the incoming differential QAM signal being demodulated, and (ii) the point on the channel effects signal corresponding to the point on the incoming differential QAM signal being demodulated.

16. The method of claim 13 wherein the error correction factor is derived from the ratio of the point immediately succeeding and the point immediately succeeding the point on the channel effects signal corresponding to the point on the incoming differential QAM signal being demodulated.

17. A telecommunication receiver comprising:

an antenna receiving RF signals;

a down converting receiving the RF signal from the antenna and outputting a down converted baseband signal;

an analog to digital converter receiving the baseband signal and outputting a digital baseband signal;

a Nyquist filter coupled to the analog to digital converter receiving the digital baseband signal and outputting a wave shaped complex signal;

a magnitude tracker coupled to the Nyquist filter receiving as input the wave shaped complex signal, wherein the complex signal comprises an in-phase component and a quadrature phase component, the magnitude tracker comprising a magnitude signal generator receiving as input the in-phase and quadrature components of the complex signal and generating a magnitude signal therefrom;

a moving average filter receiving the magnitude signal and generating therefrom a moving average signal;

a comparator/normalizer receiving both the magnitude signal and the moving average signal and outputting a normalized magnitude signal;

a smoothing filter receiving the normalized magnitude signal and generating therefrom a channel effects reconstruction signal; a a channel effects compensation factor generator receiving the channel effects reconstruction signal and generating therefrom a channel effects compensation factor;

a demodulator receiving the magnitude signal and the channel effects compensation factor and outputting a digital signal corresponding to the magnitude variations of the magnitude signal, wherein the threshold for determining magnitude variations in the magnitude signal is determined, at least in part, from the channel effects compensation factor.

18. The receiver of claim 17 wherein said magnitude tracker comprises processes running on a digital signal processor.

19. The receiver of claim 17 wherein said magnitude tracker comprises processes running on a microprocessor.

20. The receiver of claim 17 wherein magnitude tracker is comprised of circuits formed on a digital signal processor.

21. A method for decoding a differentially encoded transmitted signal comprising:

receiving a signal, the signal comprising an information component and a channel-induced distortion component, the information component comprising a stream of symbols and including magnitude variations between adjacent symbols;

canceling from the received signal the magnitude variations between adjacent symbols arising from the information component in order to reconstruct the channel-induced distortion component of the received signal; and generating a correction factor from the reconstructed channel-induced distortion component of the received signal, the correction factor being based upon magnitude variations between adjacent symbols in the channel-induced distortion component.

22. The method of claim 21 further comprising:

modifying the received signal by the correction factor.

23. The method of claim 21 wherein each symbol has a magnitude associated with it and the correction factor is a ratio between the magnitude of a symbol under consideration and the magnitude of a preceding symbol.

* * * * *